P. H. MERRILL.
Steam-Heaters.
No. 143,525. Patented Oct. 7, 1873.
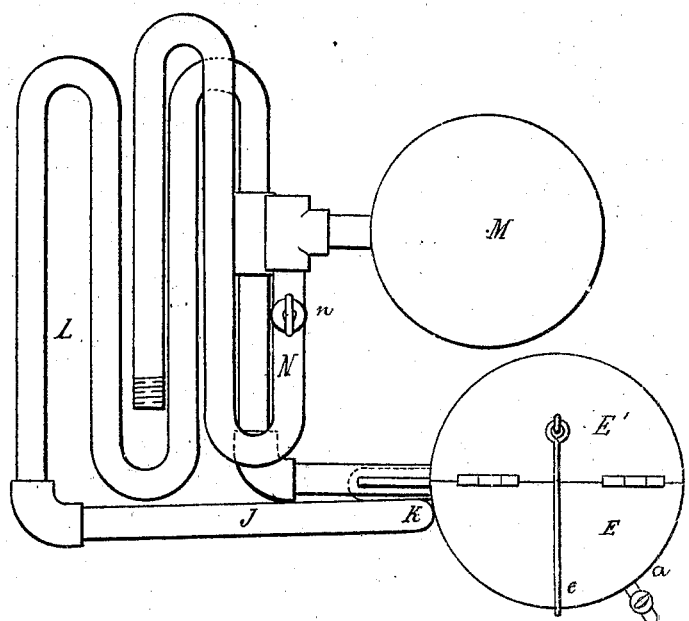
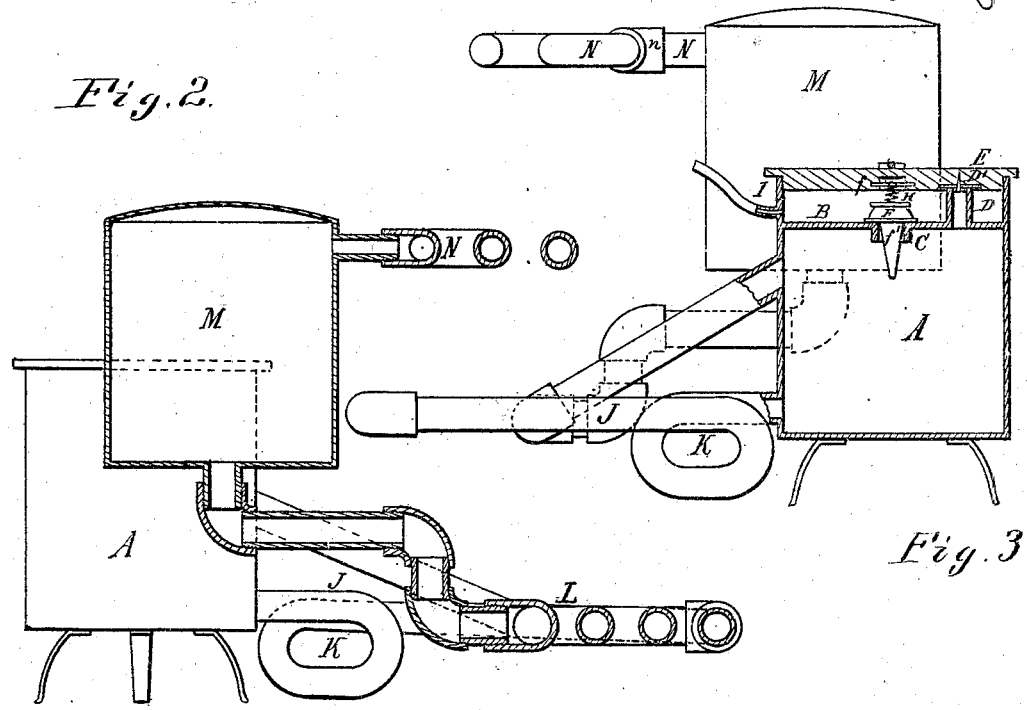
Witnesses.
E. P. Bates,
George E. Upham,
Inventor.
Peter H. Merrill,
Chipman & Hosmer
Attys

UNITED STATES PATENT OFFICE.

PETER H. MERRILL, OF PARDEEVILLE, WISCONSIN.

IMPROVEMENT IN STEAM-HEATERS.

Specification forming part of Letters Patent No. 143,525, dated October 7, 1873; application filed June 21, 1873.

*To all whom it may concern:*

Be it known that I, PETER H. MERRILL, of Pardeeville, in the county of Columbia and State of Wisconsin, have invented a new and valuable Improvement in Heaters for Stoves; and I do hereby declare that the following is a full, clear, and exact description of the construction and operation of the same, reference being had to the annexed drawings making a part of this specification, and to the letters and figures of reference marked thereon.

Figure 1 of the drawings is a representation of my improved stove-heater by a top view. Figs. 2 and 3 are vertical sections of the same. Fig. 4 is a detailed view of a safety-valve pertaining thereto.

My invention relates to steam-heaters; and it consists of a water-reservoir with new devices for filling the same, for removing the air during the said operation, and for regulating the steam-pressure, said water-reservoir communicating with both ends of a hollow fire-grating, and of a steam-drum, which serves also as collector for condensed steam from the steam heating-pipes with which it is connected, the whole to be operated by a cooking-stove, on which the steam-drum may be allowed to rest.

The object of my invention is to have a movable steam-heater of cheap construction, which for operation does not rely on a fire-room especially constructed for the purpose mentioned.

In the drawings, A represents a vessel or reservoir for water, which has a false bottom or a partition, B, near its top, provided with a valve-seat, C, and an upright tube, D. The top of the vessel A is closed by a lid, E, which is hinged to a stationary cover, E', and locked by a hasp, e, and a staple on the vessel A, and which carries an elastic cushion, D', for closing the tube D, and is also provided with a spring-weighted safety-valve, F. The lower part of the valve F is provided with a conical foot, f', which serves to enter the valve-seat C, and gradually guide the valve toward its seat when the lid E is closed. The room between the partition B and the covers E' and E is relieved of waste steam by an exhaust-pipe, I. From the bottom part of the vessel A a water-pipe, J, proceeds, and, after forming a coil, K, enters the stove, and there forms the grating L by a number of returns. Leaving the coal or fire pit, the said pipe connects with a separator, M, outside the stove, and with the reservoir A at a higher elevation than that at which it started from the same. This latter arrangement serves to force the generated steam, which, on account of its light weight, seeks the highest places of its confinement, to move toward the steam-drum or separator M, and keep up a circulation from the coil K toward the steam-drum M and the reservoir A. From the top of the steam-drum M the steam or heating pipe N proceeds to the different apartments of the building. The lower part of the reservoir A may be provided with a stop-cock for drawing off hot water for kitchen purposes, and to facilitate the cleaning of the vessel. The steam-pipe N may be provided with a stop-cock, n, to shut off the steam from the heaters when so desired.

The reservoir A, being of tolerably large size, may do service for one or more days without refilling. When a fresh supply of water is necessary the lid E is unlocked and opened, whereby the safety-valve F is entirely withdrawn from its seat, and the reservoir is filled through the valve-seat. Any air that may have entered the pipes and the reservoir A is expelled by the rising water through the tube D. When filled the reservoir is closed again by inserting the conical foot f' of the valve F into the valve-seat C, and shutting up the lid E in the manner aforesaid.

The connection of the steam-pipe N with the steam-drum M is effected by a T-joint, u, so that there are means for attaching a pipe or hose to the other end of it for obtaining steam for kitchen purposes.

What I claim as new, and desire to secure by Letters Patent, is—

1. In a steam-generator for heating purposes, the hollow grating L, connected at both ends with the water-reservoir A, and near the steam end with the steam-drum and separator M, substantially as specified.

2. In a steam-generator, the combination of a closed reservoir, A, with the partition B, the air-tube D, the spring-weighted safety-valve F, the pivot $f$, the lid E, the elastic packing D, and the exhaust-pipe I, substantially as specified.

3. In combination with the water-reservoir A, as described, the steam-drum or separator M, air and steam trap K, steam-pipes N, and hollow grating L, substantially as and for the purposes set forth.

In testimony that I claim the above I have hereunto subscribed my name in the presence of two witnesses.

PETER HACKETT MERRILL.

Witnesses:
JAMES B. TAYLOR,
H. S. HASKELL.